(12) United States Patent
Itagaki (10) Patent No.: US 10,655,578 B2
(45) Date of Patent: May 19, 2020

(54) INTAKE DUCT STRUCTURE OF ENGINE INTAKE SYSTEM FOR INTERNAL COMBUSTION ENGINE

(71) Applicant: HONDA MOTOR CO., LTD., Tokyo (JP)

(72) Inventor: Keisuke Itagaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 48 days.

(21) Appl. No.: 15/993,041

(22) Filed: May 30, 2018

(65) Prior Publication Data

US 2018/0363599 A1 Dec. 20, 2018

(30) Foreign Application Priority Data

Jun. 14, 2017 (JP) .................................. 2017-116986

(51) Int. Cl.
*F02M 35/16* (2006.01)
*F02M 35/12* (2006.01)
(Continued)

(52) U.S. Cl.
CPC ...... *F02M 35/104* (2013.01); *F02M 35/1233* (2013.01); *F02M 35/1255* (2013.01); (Continued)

(58) Field of Classification Search
CPC ......... F02M 35/10295; F02M 35/1216; F02M 35/1255; F02M 35/1261; F02M 35/1266; F02M 35/1283; F02M 35/14; F16L 55/033
(Continued)

(56) References Cited

U.S. PATENT DOCUMENTS 5,804,777 A * 9/1998 Kim ........................ F02F 7/006
181/229
10,096,847 B2 * 10/2018 Mito ...................... B60K 13/02
(Continued)

FOREIGN PATENT DOCUMENTS

DE 102010022780 A1 * 12/2011 ............ F16L 55/033
DE 102018200699 A1 * 7/2018 ............. F02B 37/16
(Continued)

OTHER PUBLICATIONS

English Machine Translation Provided by Espacenet of JP 11170875 A (Okada) (Year: 2019).*
(Continued)

*Primary Examiner* — Jacob M Amick
*Assistant Examiner* — Michael A Kessler
(74) *Attorney, Agent, or Firm* — Armstrong Teasdale LLP (57) ABSTRACT

An intake duct structure (22) of an engine intake system for an internal combustion engine of a vehicle includes a passage portion (28) internally defining an air passage having an air inlet (22A) located in an upstream end part of the passage portion and an air outlet (22B) located in a downstream end part of the passage portion, and extending above a structural member (40, 11B) of a vehicle body, and a resonator portion (29) depending from the downstream end part of the passage portion and internally defining a resonator chamber (35). The passage portion is provided with a bottom surface (28G) configured to rest on an upper surface of the structural member, and the resonator portion is provided with a vertical surface (29C) opposing a vertical surface of the structural member.

16 Claims, 9 Drawing Sheets

(51) Int. Cl.
*F02M 35/104* (2006.01)
*B29C 45/00* (2006.01)

(52) U.S. Cl.
CPC ...... *F02M 35/1283* (2013.01); *F02M 35/161* (2013.01); *B29C 45/006* (2013.01)

(58) Field of Classification Search
USPC ..................................... 123/184.57; 181/229
See application file for complete search history.

(56) References Cited

U.S. PATENT DOCUMENTS

| | | | | |
|---|---|---|---|---|
| 2007/0113815 | A1* | 5/2007 | Kawarai | F02M 35/024 |
| | | | | 123/184.21 |
| 2008/0236534 | A1* | 10/2008 | Mayer | B60T 17/04 |
| | | | | 123/184.57 |
| 2009/0178879 | A1* | 7/2009 | Park | B01D 46/10 |
| | | | | 181/224 |
| 2009/0236171 | A1* | 9/2009 | Yokoya | F02M 35/10295 |
| | | | | 181/160 |
| 2009/0242323 | A1* | 10/2009 | Densmore | F02M 35/1255 |
| | | | | 181/229 |
| 2010/0140004 | A1* | 6/2010 | Ohzono | B60K 13/02 |
| | | | | 180/68.3 |
| 2011/0011670 | A1* | 1/2011 | Ishida | F01N 1/04 |
| | | | | 181/247 |
| 2015/0267580 | A1* | 9/2015 | Ninomiya | F01N 13/002 |
| | | | | 60/317 |
| 2016/0195049 | A1* | 7/2016 | Zirkelbach | F02M 35/1216 |
| | | | | 181/229 |
| 2019/0107087 | A1* | 4/2019 | Nagata | F02M 35/10144 |

FOREIGN PATENT DOCUMENTS

| | | | | | |
|---|---|---|---|---|---|
| EP | 3171014 | A2 | * | 5/2017 | ......... F02M 35/1288 |
| JP | S603117 | U | | 1/1985 | |
| JP | H11170875 | A | | 6/1999 | |
| JP | 2001-207925 | A | | 8/2001 | |
| JP | 2005120918 | A | | 5/2005 | |
| JP | 2005256745 | A | * | 9/2005 | |
| JP | 2005256745 | A | | 9/2005 | |
| JP | 2008296853 | A | * | 12/2008 | |
| JP | 2012177349 | A | * | 9/2012 | ......... F02M 35/0204 |
| JP | 2016133034 | A | | 7/2016 | |

OTHER PUBLICATIONS

English Machine Translation Provided by Espacenet of JP 2001207925 A (Hayashibara) (Year: 2019).*
English Machine Translation Provided by Espacenet of JP 2008296853 A (Kudo) (Year: 2019).*
English Machine Translation Provided by Espacenet of JP 2005256745 A (Mori) (Year: 2019).*
Notice of Reasons of Rejection for JP Application No. 2017-116986, dated Sep. 18, 2018, 7 pages.
Notification of Reasons for Refusal for Japanese Patent Application No. 2017-116986, dated Jan. 8, 2019, 3 pages.

* cited by examiner

INTAKE DUCT STRUCTURE OF ENGINE INTAKE SYSTEM FOR INTERNAL COMBUSTION ENGINE

TECHNICAL FIELD

The present invention relates to an intake duct structure of an engine intake system for an internal combustion engine of a vehicle.

BACKGROUND ART

In a vehicle powered by an internal combustion engine, an intake duct structure (intake duct structure) for the engine may be provided with a resonator for reducing noises. JP2001-207925A discloses an intake duct structure incorporated with a resonator. The intake duct structure disclosed in JP2001-207925A is formed by a first part including an upper half of a passage portion, a second part including a lower half of the passage portion and internally defining a resonator chamber, and a partition wall part interposed between the first part and the second part and defining a narrowed neck portion communicating the interior of the resonator chamber with the air passage defined in the passage portion. This intake duct structure consists of three pieces, but the partition wall part is interposed between the first part and the second part so that the three parts can be joined to one another by a single welding operation.

The intake duct structure disclosed in JP2001-207925A is advantageous in terms of the ease of manufacture, but may not be very advantageous in terms of the ease of assembling the intake duct structure to the vehicle body. In particular, when fixedly securing the intake duct structure to the vehicle body, the intake duct structure is required to be held in position by the worker while the intake duct structure is being fastened to the vehicle body. This is detrimental to the efficiency of the assembling work.

SUMMARY OF THE INVENTION

In view of such a problem of the prior art, a primary object of the present invention is to provide an intake duct structure that is configured to be assembled to the vehicle body with ease.

To achieve such an object, one aspect of the present invention provides an intake duct structure (22) of an engine intake system for an internal combustion engine (13) of a vehicle (1), the intake duct structure comprising: a passage portion (28) internally defining an air passage having an air inlet (22A) located in an upstream end part of the passage portion and an air outlet (22B) located in a downstream end part of the passage portion, the passage portion extending above a structural member (40, 11B) of a vehicle body; and a resonator portion (29) depending from the downstream end part of the passage portion and internally defining a resonator chamber (35); wherein the passage portion is provided with a bottom surface (28G) configured to rest on an upper surface of the structural member, and the resonator portion is provided with a vertical surface (29C) opposing a vertical surface of the structural member.

Because the vertical surface of the resonator portion opposes the vertical surface of the structural member when the bottom surface of the passage portion is caused to rest upon the upper surface of the structural member, the intake duct structure can be held on top of the structural member in a stable manner by itself so that the assembly work of the intake duct structure is facilitated.

In a preferred embodiment of the present invention, the upstream end part of the passage portion is located in a front end part of the passage portion, and the downstream end part of the passage portion is located in a rear end part of the passage portion.

In this case, the intake duct structure can be mounted on a laterally extending structural member of the vehicle body such as an upper cross member of a front bulkhead, and the intake duct structure is prevented from rocking rearward and falling off from the structural member.

Preferably, at least the upstream end part of the passage portion extends substantially horizontally, and the resonator portion internally defines a neck portion (36) communicating the air passage with the resonator chamber.

Thus, the resonator portion is positioned behind the structural member of the vehicle so that the space efficiency of the engine room can be improved.

The bottom surface of the passage portion may extend substantially perpendicularly to the vertical surface of the resonator portion.

Thereby, the intake duct structure can be supported by the structural member of the vehicle in a most stable manner.

Preferably, the intake duct structure has a gravitational center located under the bottom surface of the passage portion and ahead of the vertical surface of the resonator portion.

Thereby, the stability of the intake duct structure on the structural member of the vehicle can be maximized.

Preferably, the bottom surface of the passage portion is provided with a semi-cylindrical shape having an axial line extending in a fore and aft direction, and is received in a complementary recess (50) formed in a part of the structural member. Thereby, the intake duct structure can be retained in a stable manner, and a large cross sectional area for the intake duct structure can be attained in a space efficient manner.

Preferably, the vertical surface of the resonator portion is generally planar in shape.

Thereby, the intake duct structure can be retained in a stable manner against a flat surface of the structural member of the vehicle body.

Preferably, a horizontal distance (D2) between the vertical surface of the resonator portion and an upstream end of the passage portion is greater than a horizontal distance (D3) between the vertical surface of the resonator portion and a rear end of the resonator portion.

Thereby, the gravitational center of the intake duct structure can be positioned on the side of the upstream end part of the passage portion.

Preferably, the vertical front surface of the resonator portion is greater in height (D1) than in width (D6).

Because the front surface of the resonator portion is thus vertically elongated, even when the upstream end part of the passage portion is placed on the structural member in an imprecise manner, the intake duct structure is prevented from becoming unstable.

Preferably, the resonator portion is formed by combining an upstream side half (29A) and a downstream side half (29B).

The upstream side half and the downstream side half may be provided with shapes that are suitable for molding, and the neck portion communicating the resonator chamber with the passage defined in the passage portion can be formed without any difficulty.

Preferably, the air outlet is defined by a connecting portion (22B) having a tubular configuration and configured to be connected to a downstream side intake duct, and the connecting portion is integrally formed with the downstream side half.

Thereby, the number of component parts can be minimized, and the assembly work is facilitated.

Preferably, the upstream end part of the passage portion is formed by combining a relatively hard lower half (28A) and a relatively soft upper half (28E), and the lower half is integrally formed with the upstream side half.

The relatively soft upper half favorably absorbs impact at the time of a crash. Because the lower half of the passage portion is integrally formed with the upstream half of the resonator portion, the number of components for the intake duct structure can be minimized, and the assembly work for the intake duct structure can be simplified.

Preferably, the upper half is provided with a flange (37) extending beyond an outer profile of the lower half.

Thereby, the upstream end part of the passage portion that rests upon the structural member is increased in weight with the result that the stability of the intake duct structure on the structural member increases.

Preferably, the lower half is integrally provided at a downstream end thereof with an annular portion configured to be connected to the connecting portion, and the upper half is provided with a semi-cylindrical portion that fits upon an upper half of the annular portion.

Thereby, the upper half and the lower half can be joined to each other without involving any significant fear of air leakage.

Preferably, the annular portion defines a part of the air passage having a substantially circular cross section, and a part of the air passage upstream of the annular portion expands laterally toward the upstream end part of the passage portion.

Thereby, the vertical dimension of the upstream part of the passage portion can be minimized while ensuring a large cross sectional area over the entire length of the passage defined by the passage member.

Preferably, the structural member includes a cross member (40) of a front bulkhead and a shroud (11B) of a radiator (11) supported by the cross member, the passage portion extends in a fore and aft direction above the cross member, and the resonator portion opposes a rear side of the shroud of the radiator.

Thereby, the resonator portion may be positioned in a space efficient manner, and is favorably protected from the heat emitted from the radiator.

DESCRIPTION OF THE PREFERRED EMBODIMENT(S)

A preferred embodiment of the present invention is described in the following with reference to the appended drawings.

Figure 1:
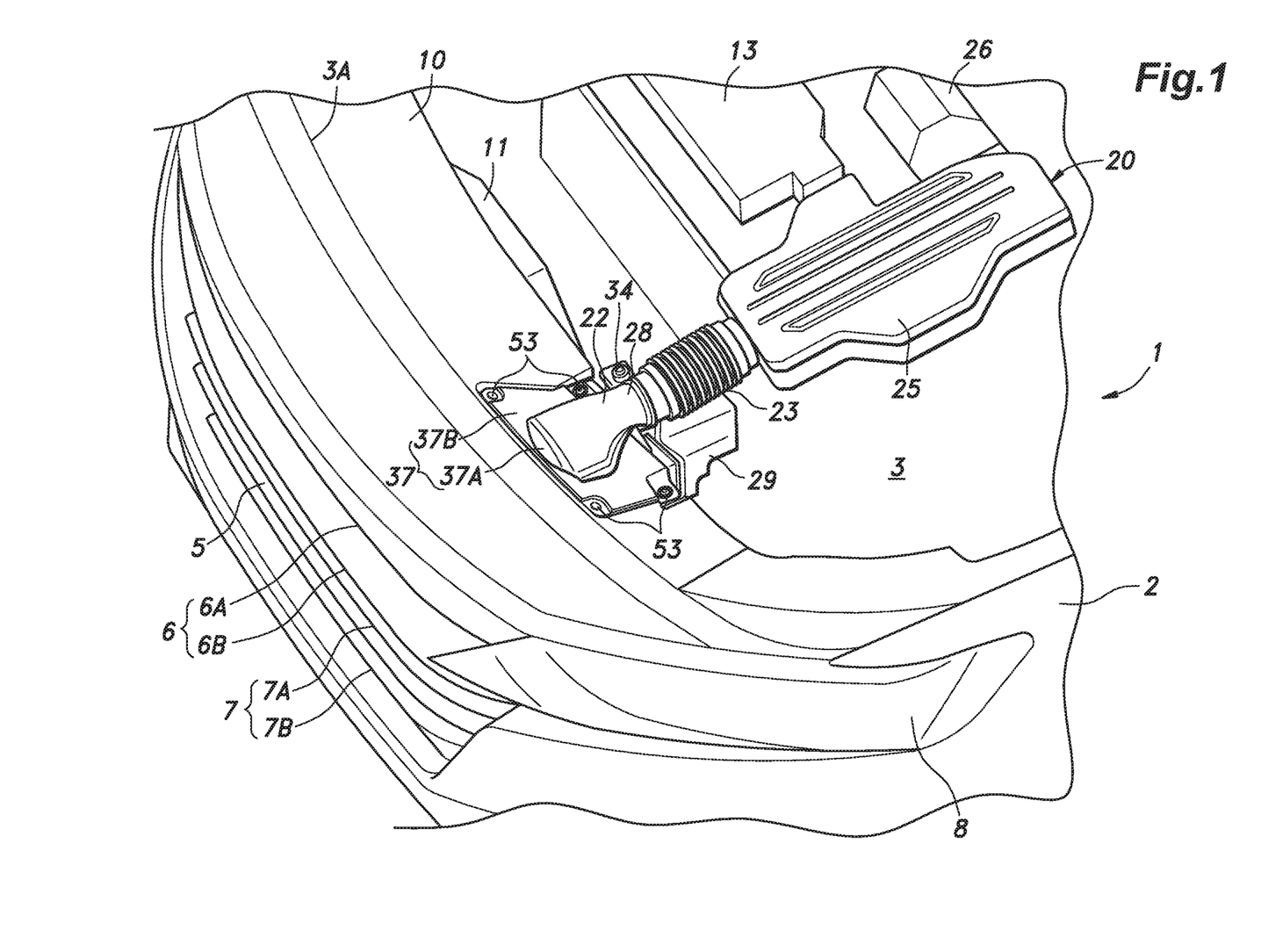
FIG. 1 is a perspective view of a front part of a motor vehicle according to an embodiment of the present invention.

FIG. 1 shows a front part of a motor vehicle 1 according to an embodiment of the present invention. An engine room 3 is defined in a front part of a vehicle body 2. An engine hood 4 (FIG. 8) covers the engine room 3 from above. The engine hood 4 and other devices not relevant to the present invention are omitted from illustration in FIG. 1.

Figure 8:
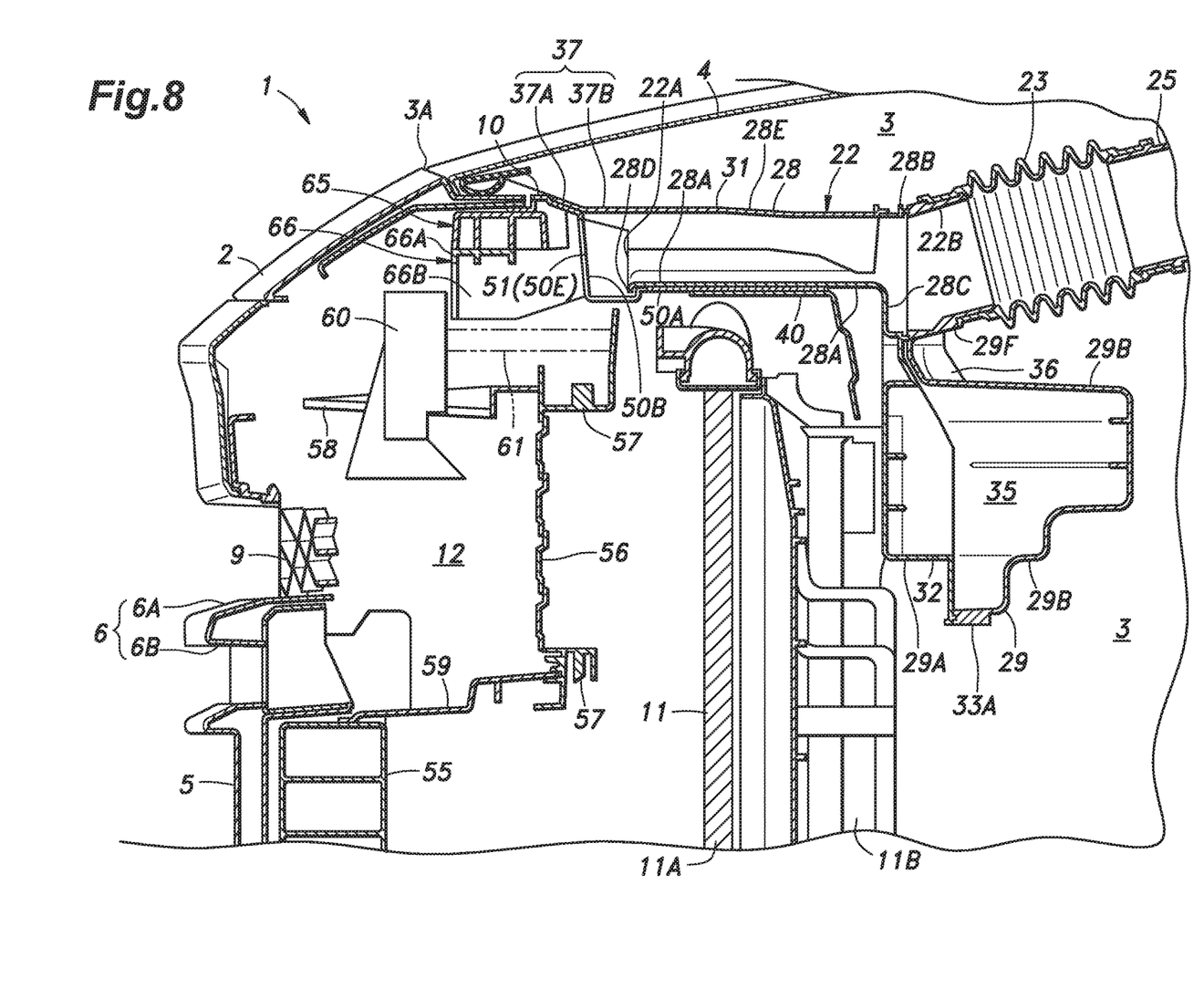
FIG. 8 is a sectional view taken along line VIII-VIII of FIG. 7.

Referring also to FIG. 8, a front bumper 5 extends laterally at the front end of the vehicle body 2. An upper vehicle body opening 6 is defined above the upper edge of the front bumper 5, and a lower vehicle body opening 7 is defined below the lower edge of the front bumper 5. A pair of front lights 8 are provided on either lateral end of the front end of the vehicle body 2. The upper vehicle body opening 6 includes an upper opening 6A and a lower opening 6B which are located one above the other, and extend laterally between the two front lights 8. The upper opening 6A is fitted with a front upper grill 9. The lower vehicle body opening 7 also includes an upper opening 7A and a lower opening 7B which extend laterally and are located one above the other.

A front bulkhead having a frame structure is provided in a part of the engine room 3 at a certain distance from the part of the vehicle body 2 defining the upper and lower vehicle body openings 6 and 7, and an engine radiator 11 is supported by the front bulkhead. A cover member 10 made of a plastic sheet member extends from the upper end of the bulkhead to the opposing front end part of the vehicle body 2 so as to cover an upper part of a space 12 defined between the front bulkhead and the opposing front end part of the vehicle body 2 (or between the upper vehicle body opening 6 and the radiator 11). The cover member 10 thus extends substantially horizontally under the engine hood 4.

A rear part of the engine room 3 accommodates an internal combustion engine 13 having a laterally extending crankshaft. The engine 13 is provided with an intake system 20 which includes an upstream side duct module 22 having an air inlet 22A and incorporated with an upstream resonator, a bellows pipe 23 having an upstream end connected to the rear end (downstream end) of the upstream side duct module 22, and a downstream side duct module 25 having an upstream end connected to the rear end (downstream end) of the bellows pipe 23 and incorporated with a downstream resonator.

The upstream side duct module 22 is an example of an intake duct structure of the present invention for admitting air to be supplied to the engine 13, and is attached to a part of the cover member 10 located on the left hand side thereof. The downstream side duct module 25 is elongated in the fore and aft direction, and has a small vertical dimension as compared to the width thereof. The downstream side duct module 25 extends in the fore and aft direction along the left side of the engine 13, and is connected to an air cleaner 26 located behind the engine 13. The downstream end of the air cleaner 26 is connected to an intake manifold of the engine 13 not shown in the drawings.

Figure 2:
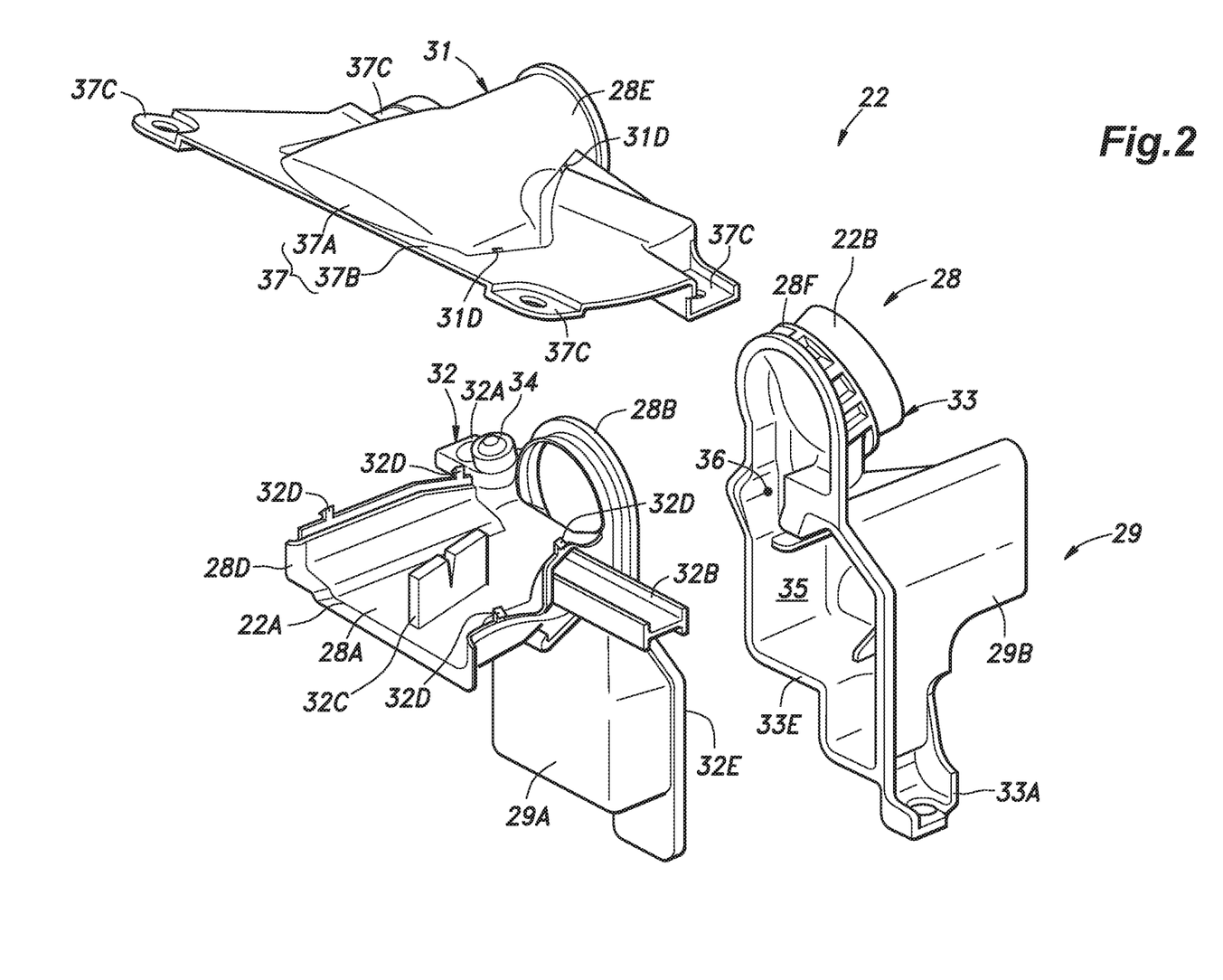
FIG. 2 is an exploded perspective view of an upstream side duct module shown in FIG. 1.
Figure 3:
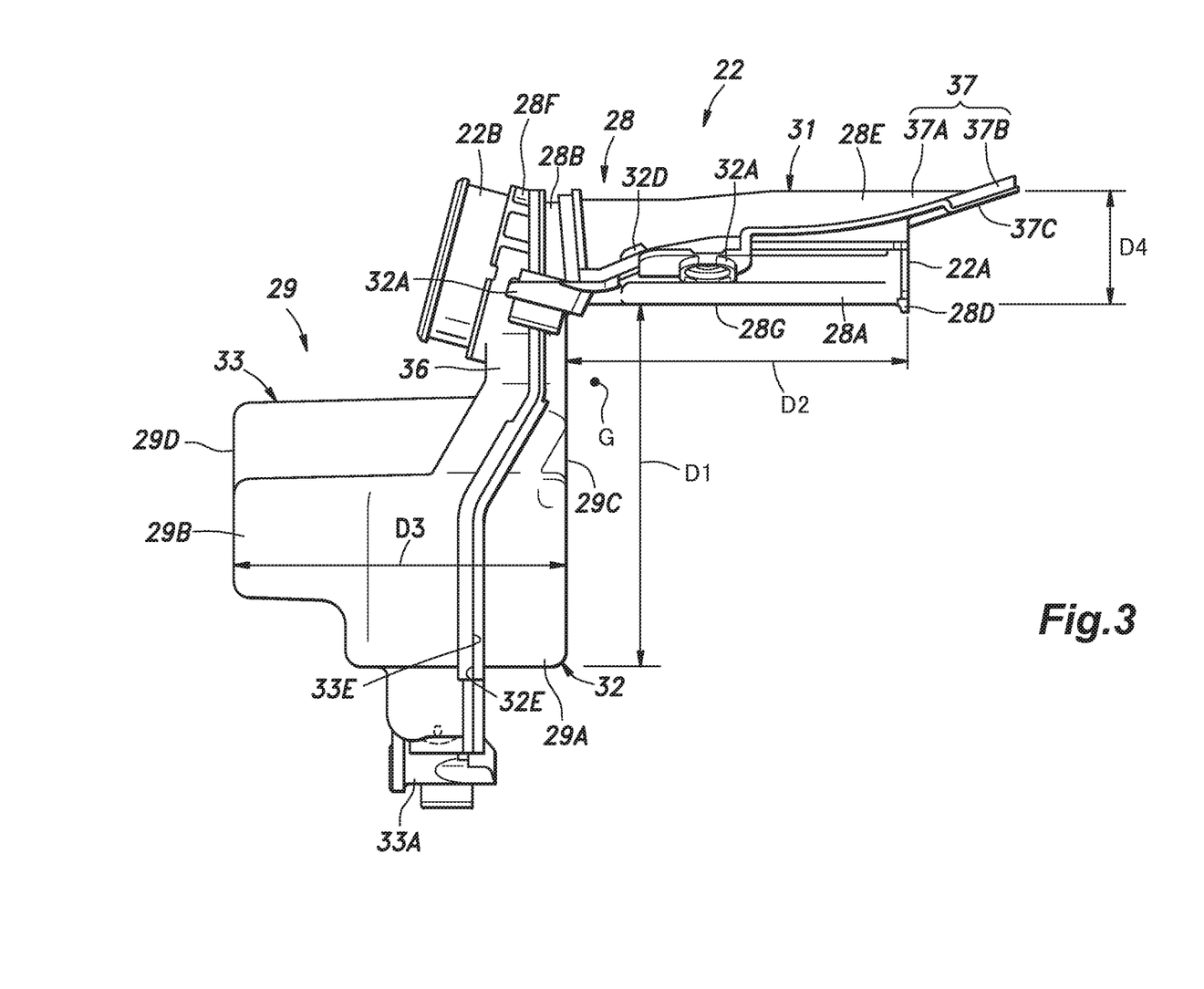
FIG. 3 is a right side view of the upstream side duct module.

FIG. 2 shows an exploded perspective view of the upstream side duct module 22, and FIG. 3 is a right side view of the upstream side duct module 22. As shown in FIGS. 2 and 3, the upstream side duct module 22 includes a passage portion 28 defining an intake passage (air passage) extending in the fore and aft direction, and a resonator portion 29 (upstream resonator) depending from a rear part (downstream part) of the passage portion 28. The upstream side duct module 22 is made of three pieces (first to third pieces) 31-33 each consisting of a molded plastic member. The second and third pieces 32 and 33 are joined to each other in the fore and aft direction, and the first piece 31 is joined to an upper end of the second piece 32.

Figure 4:
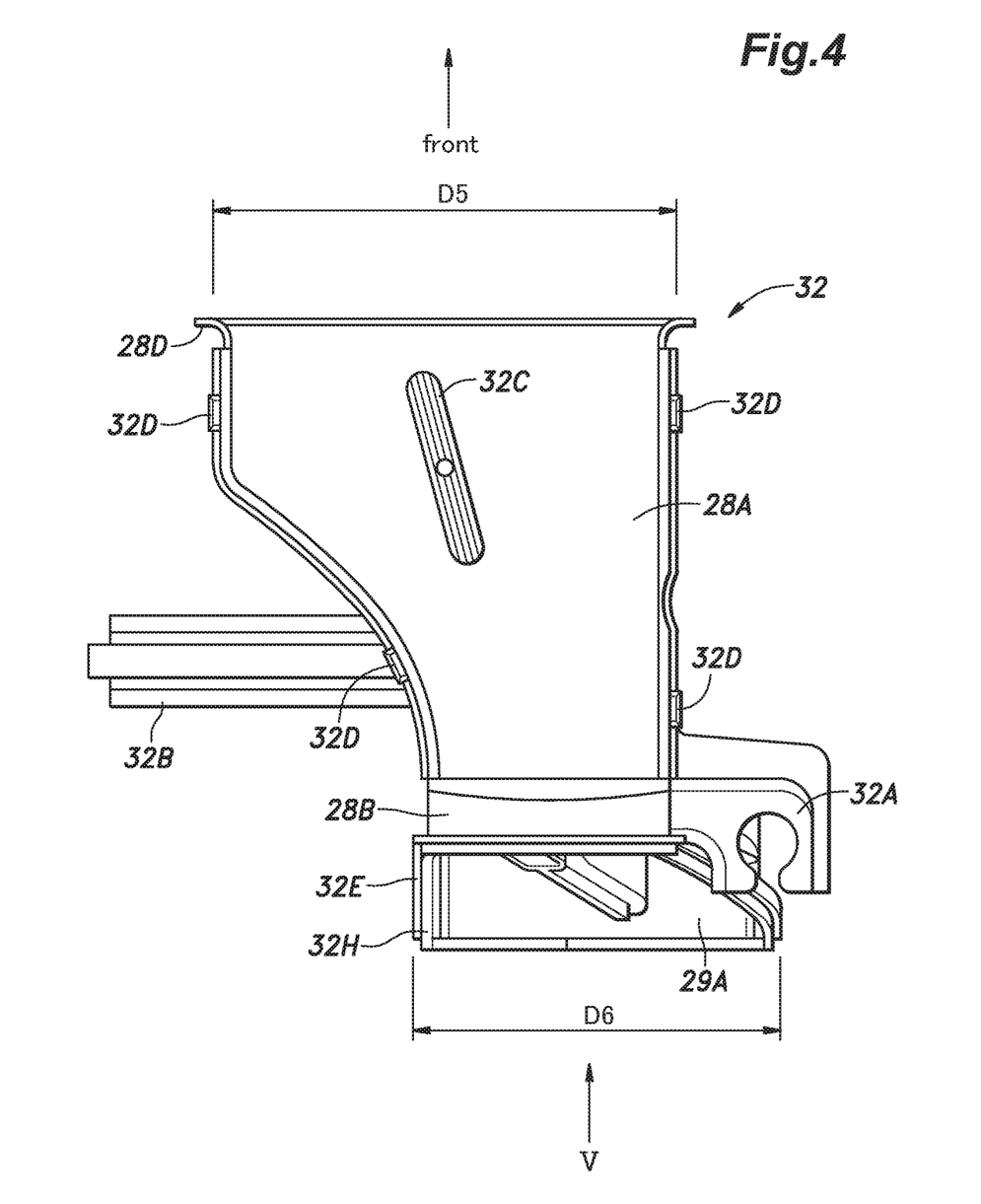
FIG. 4 is a plan view of a second piece forming a part of the upstream side duct module.
Figure 5:
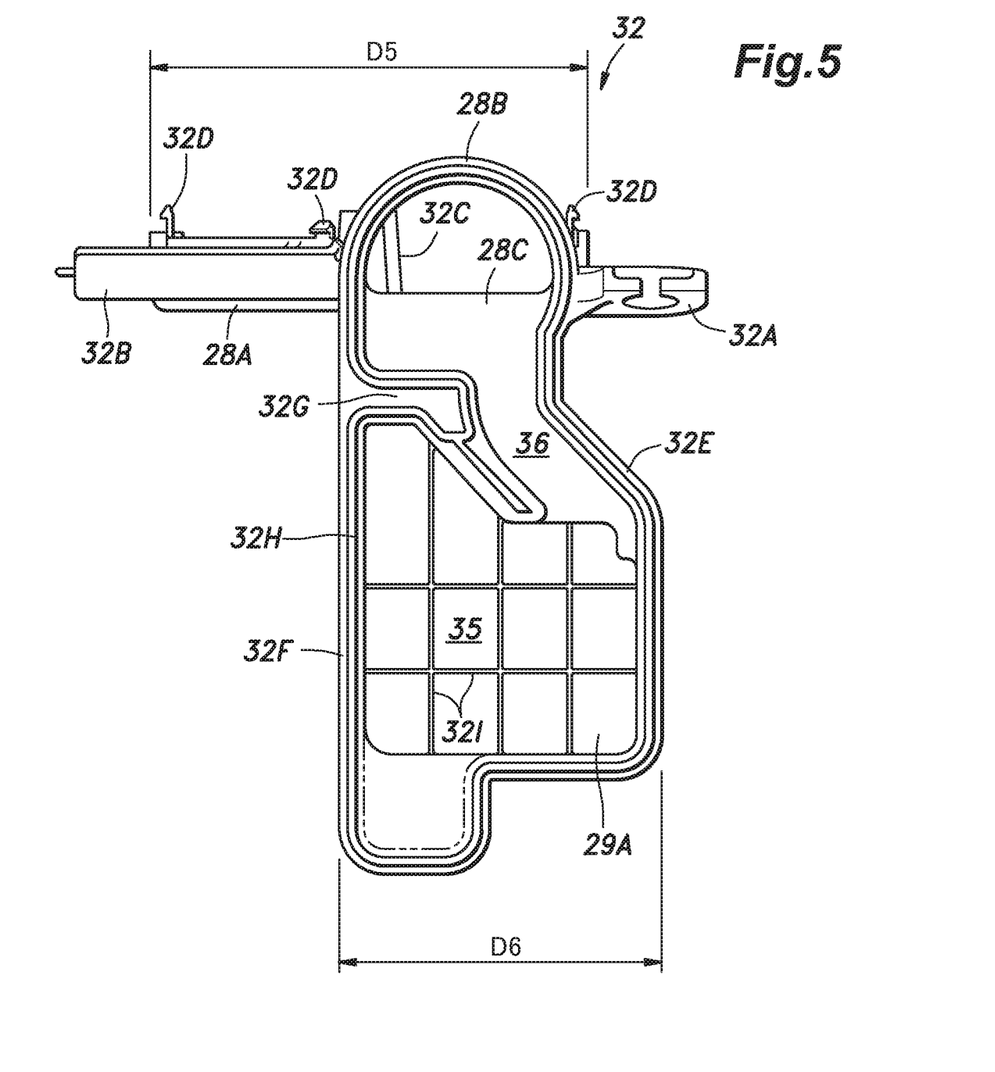
FIG. 5 is a rear view of the second piece.

FIG. 4 is a plan view of the second piece 32, and FIG. 5 is a rear view of the second piece 32. As shown in FIGS. 2 to 5, the second piece 32 includes a first annular portion 28B having a central axial line directed in the fore and aft direction, a lower half 28A extending forward from a lower half part of the first annular portion 28B, and a front half 29A depending from the first annular portion 28B and forming a front wall of the resonator portion 29. The first annular portion 28B internally defines a substantially circular opening. The lower half 28A is provided with a laterally elongated trough shape having a concave side facing upward, and the left side of the lower half 28A laterally spreads out toward the front end thereof so that the lower half 28A is formed as a lower flared part 28D or a funnel shaped portion. The lower half 28A is connected to the lower edge of the first annular portion 28B via a connecting vertical wall 28C (FIG. 5) so that the bottom surface (upper surface) of the lower half 28A is located higher than the lower end of the inner opening of the first annular portion 28B.

A tongue piece 32A extends rightward from a right rear end part of the lower half 28A, and is provided with an opening for securing the upstream side duct module 22 to the vehicle body 2 by using a fastener. A beam member 32B having an H-shaped cross section extends leftward from a left rear end part of the lower half 28A. An upright support wall 32C projects upward from the bottom surface of the lower half 28A, and extends in the fore and aft direction with a slight slant. Two pairs of engagement claws 32D projects upward from the upper ends of the side walls of the lower half 28A.

The front half 29A is provided with a wall part that bulges forward, and has an outer profile which is continuously connected to the outer profile of the first annular portion 28B so as to jointly define a flush annular mating surface 32E facing rearward.

As best shown in FIG. 5, the part of the peripheral wall of the second piece 32 defining the mating surface 32E includes an outer peripheral wall 32F extending along an outer periphery of the second piece 32 and an inwardly receding wall 32G. The inwardly receding wall 32G defines a neck portion 36 consisting of a narrowed section provided between the main part of the intake passage and a resonator chamber 35 internally defined by the resonator portion 39. The mating surface 32E is formed with a raised strip 32H projecting rearward and having a flat and flush end surface (before the second piece 32 and the third piece 33 are joined to each other as will be discussed hereinafter). The raised strip 32H extends over the entire length of the annular mating surface 32E. The part of the second piece 32 defining a front side of the resonator chamber 35 includes a rectangular deep part formed with a plurality of ribs 321 arranged in a grid pattern, and a rectangular shallow part (having a substantially zero depth) extending downward from the lower end of the deep part and having a small lateral and a vertical dimension than the deep part.

The first piece 31 comprises an upper half 28E of a semi-cylindrical configuration opposing the lower half 28A and is configured to form the passage portion 28 in cooperation with the lower half 28A, and, in particular, the rear end of the upper half 28E is configured to be closely fitted onto the upper peripheral part of the first annular portion 28B in an air tight manner. The first piece 31 further comprises a flange 37 extending laterally from the lower edge of the upper half 28E. The upper half 28E diverges forward in conformity with the lower half 28A so as to jointly form the passage portion 28 that slightly flares laterally toward the front part thereof. The flange 37 extends laterally from either side of the lower half 28A and extends forward beyond the front edge of the lower half 28A.

Figure 6:
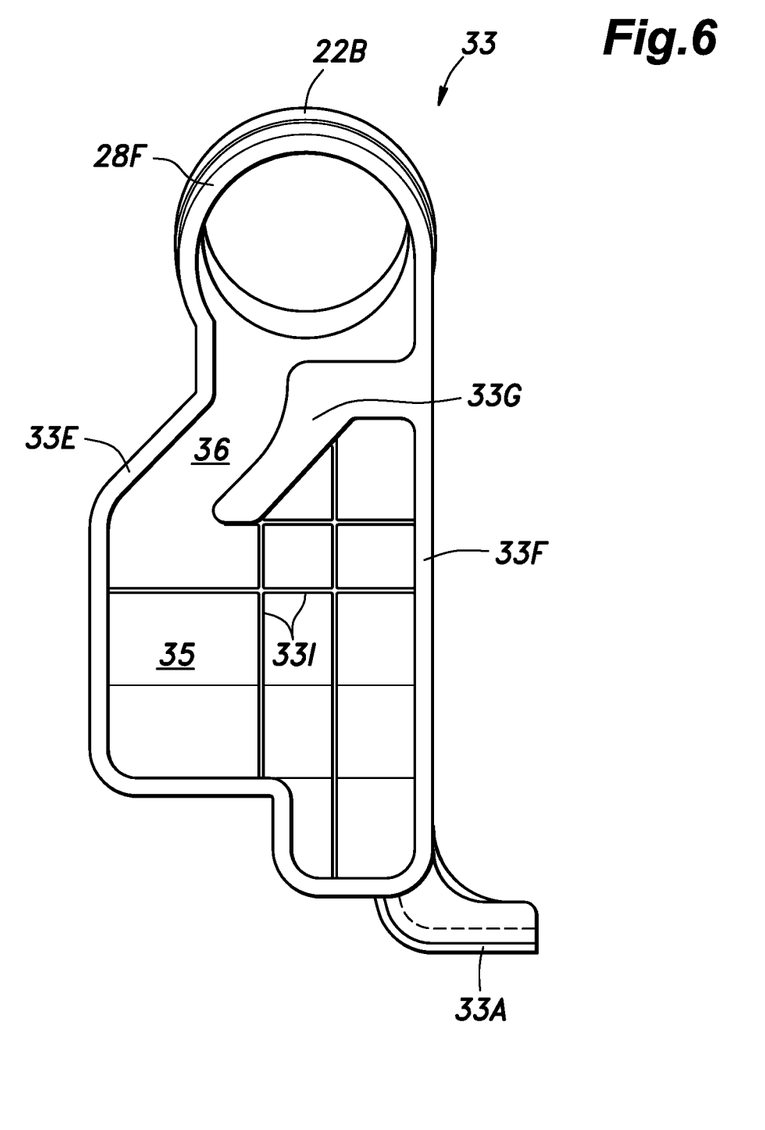
FIG. 6 is a front view of a third piece forming a part of the upstream side duct module.

FIG. 6 is a plan front view of the third piece 33. As best shown in FIG. 6, the third piece 33 comprises a second annular portion 28F having an inner opening defining the inner periphery of the passage portion 28, and a rear half 29B depending from the second annular portion 28F and having a rearwardly recessed wall part so as to form the resonator portion 29 jointly with the front half 29A. A lower end part of the rear half 29B is integrally provided with a mounting leg 33A having a hole for passing through a fastening member (not shown in the drawings). The rear end of the second annular portion 28F is provided with a tubular connecting portion 22B extending rearward and upward to be connected to the front end of the bellows pipe 23. The tubular connecting portion 22B defines an air outlet of the passage portion 28. The periphery of the second annular portion 28F and the periphery of the rear half 29B jointly form an annular flush mating surface 33E configured to conformally abut against the mating surface 32E of the second piece 32.

As shown in FIG. 6, the part of the peripheral wall of the third piece 33 defining the mating surface 33E includes an outer peripheral wall 33F extending along an outer periphery of the third piece 33 and an inwardly receding wall 33G. The inwardly receding wall 33G defines the neck portion 36 consisting of a narrowed section provided between the main part of the intake passage and the resonator chamber 35 jointly with the inwardly receding wall 32G of the second piece 32. The mating surface 33E in this case consists of a planar surface. The part of the third piece 33 defining a rear side of the resonator chamber 35 includes a rectangular main part conforming to the rectangular deep part of the second piece 32. The inner bottom surface of the main part of the third piece 33 is provided with a plurality of ribs 331 arranged in a grid pattern.

The second piece 32 and the third piece 33 are each made of a relatively hard molded plastic member (such as PP), and may be joined to each other by vibration welding, for instance. The raised strip 32H formed on the mating surface 32E of the second piece 32 is configured to melt during the course of the welding process so as to achieve a favorable welding result. Once the second piece 32 and the third piece 33 are joined to each other, the resonator chamber 35 is formed directly under the first annular portion 26B of the second piece 32 and the second annular portion 28F of the third piece 33.

The first piece 31 is made of relatively soft plastic material (such as thermoplastic resin). The rear end of the upper half 28E abuts the upper half of the first annular portion 28B, and the lower ends of the side walls of the upper half 28E abut the upper ends of the respective side walls of the lower half 28A of the second piece 32. The engagement claws 32D on the upper ends of the side walls of the lower half 28A are engaged by corresponding engagement holes 31D formed in the boundary between the upper half 28E and the flange 37. The first piece 31 and the second piece 32 thus jointly define the air inlet 22A and a front end (upstream end) part of the intake passage. The front part of the upper half 28E is spaced from the upper end of the support wall 32C so that the upper half 28E can deflect downward to a certain extent when pressed downward, but is prevented from excessively collapsing. The left side of the flange 37 which is laterally more elongated than the right side of the flange 37 is supported by the beam member 32B from below. The first piece 31 is attached to the second piece 32, but is not directly attached to the third piece 33.

The upstream side duct module 22 is thus formed by these three pieces 31 to 33, and the first annular portion 28B and the second annular portion 28F jointly define a passage having a circular cross section. The downstream part of this passage is directly communicated with the resonator chamber 35. The passage portion 28 of the upstream side duct module 22 defines a part of the intake passage that has a progressively increasing lateral dimension toward the upstream end thereof while the vertical dimension is substantially constant over the entire length thereof (the vertical height may slightly diminish toward the upstream end thereof). At any event, the cross sectional area of the intake passage defined by the passage portion 28 progressively increases toward the upstream end thereof.

As shown in FIG. 3 which shows the upstream side duct module 22 in side view, the passage portion 28 is provided with a bottom surface 28G which is substantially linear and horizontal substantially over the entire length thereof in side view, and substantially semi-cylindrical in front view. The resonator portion 29 is provided with a front surface 29C which is generally planar, and is substantially vertical over the entire length thereof in side view. Therefore, the front surface 29C and the bottom surface 28G are at a substantially right angle (which in this case means 90 degrees±15 degrees). In the illustrated embodiment, the angle between the front surface 29C and the bottom surface 28G is exactly 90 degrees. The rear surface of the resonator portion 29 progressively projects rearward toward the upper part thereof in a stepwise fashion. The vertical dimension D1 of the vertical front surface 29C of the resonator portion 29 is greater than the fore and aft dimension D2 of the horizontal linear bottom surface 28G of the passage portion 28 (D1>D2), and is greater than the fore and aft dimension D3 of the resonator portion 29 (D1>D3). The vertical part of the front surface 29C is preferably provided in an upper part of the resonator portion 29, and may extend by more than half (by more than 50% of) the height of the resonator portion 29. In the illustrated embodiment, the vertical part of the front surface 29C extends substantially over the entire height (or by more than 75%) of the resonator portion 29 (excluding the small rectangular section thereof which is substantially reduced in the lateral and the fore and aft dimension as compared to the remaining part of the resonator portion 29). In the illustrated embodiment, the vertical dimension D1 of the vertical front surface 29C of the resonator portion 29 is slightly greater than 80% of the height of the resonator portion 29.

The fore and aft dimension D2 of the passage portion 28 is preferably substantially equal to or greater than the fore and aft dimension D3 of the resonator portion 29 so that the gravitational center G of the upstream side duct module 22 may be positioned in an advantageous manner. In the illustrated embodiment, the fore and aft dimension D2 of the passage portion 28 is somewhat greater than the fore and aft dimension D3 of the resonator portion 29. The vertical dimension D1 of the vertical front surface 29C of the resonator portion 29 is twice or more (three times, in the illustrated embodiment) greater than the vertical dimension D4 of the front part of the passage portion 28 excluding the front flange 37. As a result, when the passage portion 28 is placed on the cover member 10, the front surface 29C of the resonator portion 29 is supported by the opposing surface of the shroud 11B (which will be described hereinafter) of the radiator 11 with respect to the fore and aft direction in a stable manner.

As shown in FIGS. 4 and 5, the lateral dimension D5 of the passage portion 28 is also twice or more (three times, in the illustrated embodiment) greater than the vertical dimension D4 of the front part of the passage portion 28 excluding the front flange 37. As a result, when the passage portion 28 is placed on the cover member 10, the part of the passage portion 28 defining the bottom surface 28G rests upon the cover member 10 (corresponding to a recess 50 which will be described hereinafter) in a stable manner so as not to tilt laterally. In particular, because D1 (the height of the front surface 29C)>D4 (the height of the passage portion), and D5 (the lateral width of the passage portion 28)>D4 (the height of the passage portion), the upstream side duct module 22 is kept in a stable condition with respect to all directions (both laterally and in the fore and aft direction). Furthermore, the lateral dimension (width) D6 of the front surface 29C of the resonator portion 29 is smaller than the lateral dimension (width) D5 of the passage portion 28, and is smaller than the vertical dimension (height) D1 of the front surface 29C and the fore and aft dimension D3 of the resonator portion 29.

When the upstream side duct module 22 is divided into a front part (a front part of the passage portion 28 including the flange 37) and a rear part (a rear part of the passage portion 28 and the resonator portion 29) about the vertical front surface 29C of the resonator portion 29, the rear part is heavier than the front part. Owing to the relationship that D2 (the fore and aft dimension of the front part of the passage portion 28)>D3 (the fore and aft dimension of the resonator portion 29), and the planar configuration of the front part of the passage portion 28, the gravitational center G of the upstream side duct module 22 is positioned ahead of the front surface 29C of the resonator portion 29. Also, the gravitational center G of the upstream side duct module 22 is lower than the bottom surface 28G of the passage portion 28. As a result, when the passage portion 28 is placed on top of the cover member 10, the upstream side duct module 22 is held in a stable condition by itself with respect to the fore and aft direction as well, and is prevented from tilting in the fore and aft direction.

Figure 7:
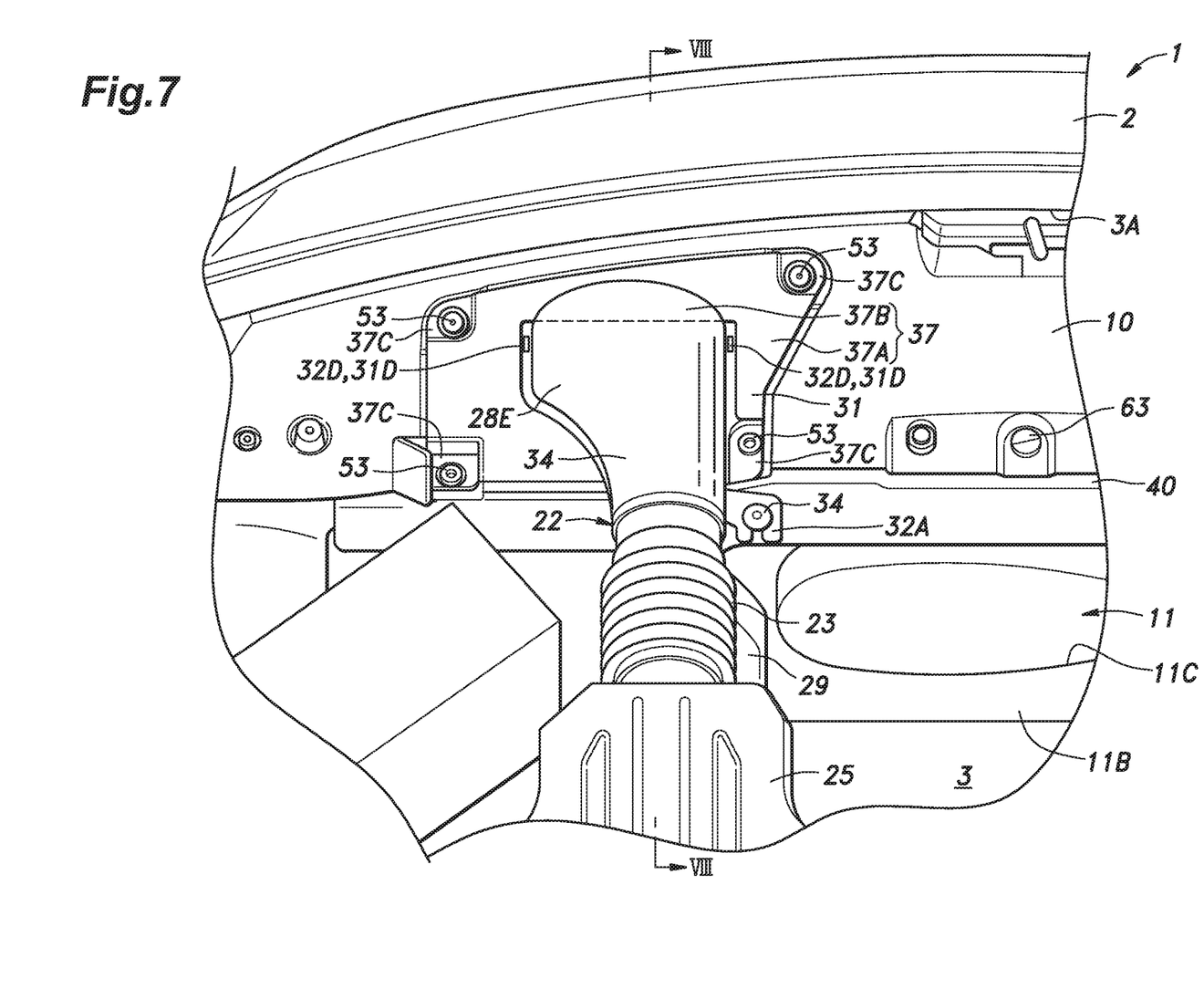
FIG. 7 is a fragmentary plan view of the front part of the motor vehicle shown in FIG. 1.

FIG. 7 is a plan view of a front part of the vehicle shown in FIG. 1, and FIG. 8 is a sectional view taken along line VIII-VIII of FIG. 7. As shown in FIGS. 7 and 8, under a rear edge part of the cover member 10 is positioned an upper cross member 40 of the front bulkhead. The upper cross member 40 extends laterally, and is made of a sheet metal strip, an angle member, a channel member or a combination of such members. In the illustrated embodiment, the upper cross member 40 is formed with a pair of sheet metal strips which are laid onto one another so as to define an L-shaped cross section by including a horizontal upper wall and a rear wall depending from the rear edge of the upper wall.

The radiator 11 includes a radiator core 11A received in the front bulkhead, a radiator fan provided on a rear side of the radiator core 11A, and a shroud 11B covering the fan from behind, and defining an air outlet 11C facing rearward. The radiator 11 is provided in a part of the engine room 3 located at a laterally central part of the vehicle body 2, and is fixedly attached to the upper cross member 40 and a lower cross member (not shown in the drawings) of the front bulkhead. The resonator portion 29 of the upstream side duct module 22 is positioned to oppose a part of the shroud 11B located to the left of the air outlet 11C.

Figure 9:
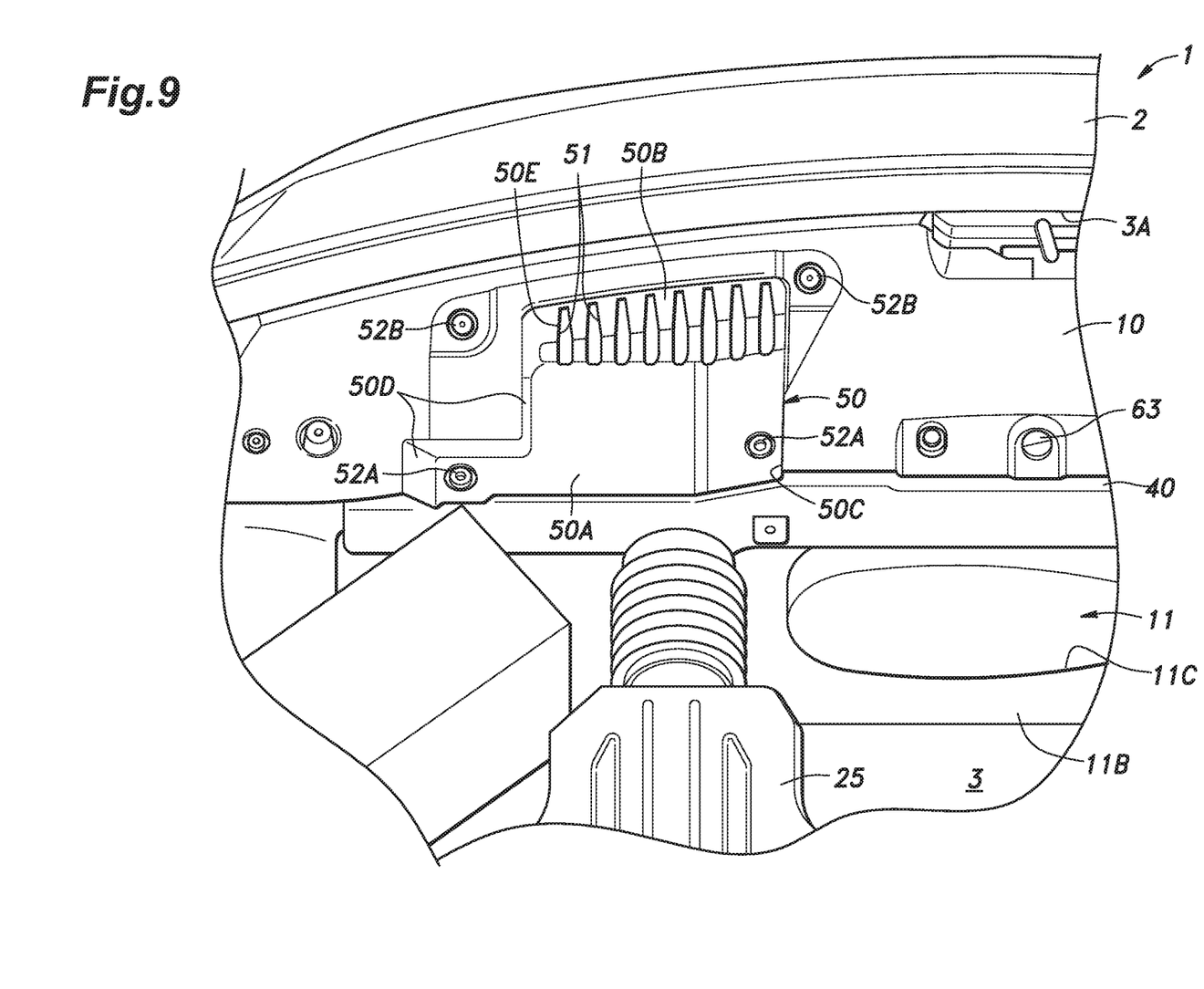
FIG. 9 is a fragmentary plan view of the front part of the motor vehicle with the upstream side duct module omitted from illustration.

FIG. 9 is a view similar to FIG. 7 with the upstream side duct module 22 omitted from illustration. As shown in FIGS. 8 and 9, a left hand side part of the cover member 10 is provided with a recess 50 which is recessed downward. The recess 50 is defined by a bottom wall 50A, a front wall 50B, a right side wall 50C and a left side wall 50D in such a manner that bottom surface of the recess 50 extends substantially horizontally in the rearward direction, and a front end part of the recess 50 is defined by a sloping surface of the front wall 50B that ascends linearly toward the front side. As shown in FIG. 8, the front end part of the bottom wall 50A of the recess 50 is lower in elevation than the remaining part of the bottom wall 50A owing to the presence of a step extending laterally in the front end part of the bottom wall 50A, and overhangs from the front edge of the upper cross member 40. The bottom wall 50A is also slanted in the lateral direction such that the right side thereof is lower than the left side thereof. The upper surface of the corresponding part of the upper cross member 40 is provided with a corresponding slant conforming to the lateral slant of the bottom wall 50A.

The front wall 50B of the recess 50 is formed with a plurality of vertically elongated slots 51 arranged laterally at a regular interval. These slots 51 may extend to a front part of the bottom wall 50A via the step extending laterally in the front end part of the bottom wall 50A. These slots 51 form an opening 50E communicating the interior of the recess 50 (the region above the cover member 10) with a front part (space 12) of the engine room 3. The front wall 50B and the bottom wall 50A of the recess 50 have a greater lateral width than the flared front end of the upstream side duct module 22 so that the combined opening area of the slots 51 may be maximized.

A rear end part of the left side wall 50D extends further leftward than the remaining part of the left side wall 50D, and a part of the bottom wall 50A extending into this extended part of the left side wall 50D is provided with a mounting hole 52A. Another mounting hole 52A is provided in a right rear end part of the bottom wall 50A. A pair of similar mounting holes 52B are formed on either side of a front edge of the bottom wall 50A. These mounting holes 52A and 52B are used for attaching the flange 37 of the upstream side duct module 22 to the cover member 10.

As shown in FIGS. 7 to 9, the upstream side duct module 22 is attached to the cover member 10 in such a manner that the lower half 28A is received in the recess 50 and the upper half 28E projects upward from the upper contour of the cover member 10. The flange 37 includes a cover portion 37A covering the recess 50 jointly and continuously with the upper half 28E so as to define a part of the intake passage, and an overlying portion 37B extending substantially horizontally from the upper half 28E and the cover portion 37A to closely overlie the part of the upper surface of the cover member 10 surrounding the recess 50.

The overlying portion 37B of the flange 37 has a substantially rectangular outer profile, and is provided with mounting holes 37 at four corners for receiving fasteners such as clips 53 that are passed into the mounting holes 52A and 52B of the cover member 10.

As shown in FIG. 8, in the installed state of the upstream side duct module 22, the air inlet 22A is spaced from the front wall 50B of the recess 50 by a certain distance. A lower flared part 28D formed in the front edge of the lower half 28A overhangs from the front edge of the step in the bottom wall 50A, and extends downward beyond the front edge of the step. The air inlet 22A is positioned slightly ahead of the upper cross member 40 and the radiator 11.

In this assembled state, the passage portion 28 of the upstream side duct module 22 is placed on the upper cross member 40 (which is a structure member of the vehicle body) via the cover member 10 at the bottom surface 28G of the passage portion 28, and the resonator portion 29 opposes the rear surface of the upper cross member 40 at the vertical front surface 29C of the resonator portion 29 over the entire height of the vertical front surface 29C with a small space between the vertical front surface 29C of the resonator portion 29 and the rear surface of the upper cross member 40. The structural member which the vertical front surface 29C opposes may be the shroud 11B of the radiator 11 or any other member attached to the vehicle body 2. The vertical front surface 29C of the resonator portion 29 may oppose the structural member without a space therebetween (namely, the vertical front surface 29C of the resonator portion 29 may abut the structural member). When installing the intake system 20 in the engine room 3, the upstream side duct module 22 is placed on the cover member 10 with the bellows pipe 23 attached thereto. Thereafter, the downstream end of the bellows pipe 23 is connected to the downstream side duct module 15.

A bumper beam 55 extends laterally behind the front bumper 5, and has two ends that are attached to the vehicle body 2 via extensions not shown in the drawings. A active grill shutter 56 is positioned between the upper vehicle body opening 6 and the radiator 11, and is retained by a frame member 57 which is attached to the upper cross member 40 at an upper end thereof and to the lower cross member at a lower end thereof. An upper flow guide plate 58 extends substantially horizontally forward from an upper part of the frame member 57, and a lower flow guide plate 59 extends substantially horizontally forward from a lower part of the frame member 57 so as to guide the air admitted from the upper vehicle body opening 6 into the active grill shutter 56. The lateral ends of the upper flow guide plate 58 terminate at a certain right hand side position and a certain left hand side position, respectively, so as to define spaces to receive auxiliary devices such as horns 60 which are supported by the frame member 57 via respective horn brackets 61.

As shown in FIG. 8, the left horn 60 is positioned above the upper edge of the upper vehicle body opening 6, and in front of and below the lower end of the recess 50 (possibly with a slight overlap therewith). Furthermore, the left horn 60 substantially aligns with the air inlet 22A in plan view. Thereby, the left horn 60 is placed in a straight path extending from the upper vehicle body opening 6 to the air inlet 22A. Therefore, the air admitted from the upper vehicle body opening 6 flows obliquely upward toward the slots 51 (in the space 12), and is forced to circumvent the left horn 60 along lateral sides and/or the upper and the lower ends of the left horn 60.

A rear edge part of the cover member 10 is placed on the upper surface of the upper cross member 40, and is attached to the upper cross member 40 by the clips 53 and 63 (FIG. 3) used for securing the upstream side duct module 22. A front edge part of the cover member 10 is placed against the lower surface of a part of the vehicle body 2 defining a front edge of the upper opening 3A of the engine room 3, and a laterally extending support member 65 is placed against the lower surface of the cover member 10, and is fixedly secured to the vehicle body 2 by using front clips (FIG. 7) passed through the support member 65 and the cover member 10 and engaged by holes provided in the part of the vehicle body 2 defining a front edge of the upper opening 3A of the engine room 3. The support member 65 is formed with grid-like ribs on the lower surface thereof for an improved stiffness, and supports the cover member 10 from below with a smooth upper surface of the support member 65.

A flow guide member 66 is attached to an underside of the support member 65 so as to be positioned ahead of the recess 50 of the cover member 10. The flow guide member 66 includes a main part 66A extending horizontally and having a planar upper surface abutting the lower surface of the support member 65 and a lower surface formed with grid-like ribs, and a partition wall 66B depending from the right edge of the main part 66A and extending in the fore and aft direction. As shown in FIG. 8, the lower edge of the partition wall 66B is substantially at a same elevation as the lower end of the recess 50, and adjacent to the right end of the recess 50 so that the external air admitted into the engine room 3 from the upper vehicle body opening 6 is allowed to be introduced into the slots 51 while preventing air from being drawn into the slots 51 from the right side.

The engine intake structure of the vehicle 1 is constructed as discussed above. In the following is described the mode of operation of this engine intake structure.

As shown in FIG. 8, when assembling the upstream side duct module 22 to the vehicle body 2, the bottom surface 28G of the front part of the passage portion 28 is placed on the upper surface of the part of the cover member 10 located on the upper cross member 40 while the vertical front surface 29C of the resonator portion 29 opposes the rear side of the radiator 11. Thereby, even when the upstream side duct module 22 is not fastened to the vehicle body 2 with the bolts 34 and the clips 53 (FIG. 1), forward rocking of the resonator portion 29 around the rear edge of the upper surface of the upper cross member 40 is prevented or restricted by abutment of the vertical front surface 29C of the resonator portion 29 against the rear side of the radiator 11. Therefore, the upstream side duct module 22 remains in place in a stable manner without requiring the assembly working holding it in place. Therefore, the work for assembling the upstream side duct module 22 to the vehicle body 2 is facilitated.

In the illustrated embodiment, the upstream end part of the passage portion 28 extends horizontally, and the resonator portion 29 extends vertically. Therefore, by resting the upstream end part of the passage portion 28 on the cover member 10 supported by the upper cross member 40, the upstream side duct module 22 can be retained in a stable manner by itself. If the upstream end part of the passage portion 28 inclines downwards toward the front, because the pivot center of the upstream side duct module 22, or the point of contact of the bottom surface 28G of the passage portion 28 shifts forwards, there may be an increased tendency for the upstream end part of the passage portion 28 to slide rearward, and this reduces the stability of the upstream side duct module 22 on the cover member 10 or the upper cross member 40. On the other hand, according to the illustrated embodiment, because the upstream end part of the passage portion 28 extends horizontally, and the width of the bottom surface 28G of the passage portion 28 is increased, the frictional force that resists the rearward movement of the passage portion 28 is increased, and the stability of the passage portion 28 on the cover member 10 can be maximized.

As shown in FIG. 3, the gravitational center G of the upstream side duct module 22 is located ahead of the vertical front surface of the resonator portion 29 and under the bottom surface 28G of the upstream end part (28A, 28E) of the passage portion 28. As a result, when the bottom surface 28G of the upstream end part of the passage portion 28 is placed on the cover member 10 supported by the upper cross member 40, the upstream side duct module 22 can be supported in an even more stable manner.

The more forward the gravitational center G is located, the more stable the upstream side duct module 22 is or the less prone for the upstream side duct module 22 to fall rearward. However, because the forward tilting of the upstream side duct module 22 is prevented by the abutting of the vertical front surface 29C of the resonator portion 29 on a structural member of the vehicle body 2, the gravitational center G of the upstream side duct module 22 may be located behind the vertical front surface 29C of the resonator portion 29.

The fore and aft dimension D2 of the passage portion 28 or the horizontal dimension between the vertical front surface 29C of the resonator portion 29 and the upstream end of the passage portion 28 is greater than the fore and aft dimension of the resonator portion 29 or the horizontal dimension between the vertical front surface 29C of the resonator portion 29 and the rear end of the resonator portion 29, the gravitational center G of the upstream side duct module 22 can be brought toward the upstream end of the passage portion 28.

The resonator chamber 35 defined in the resonator portion 29 is required to have a prescribed volume in order to reduce the sound level of a prescribed frequency. Therefore, the size of the resonator portion 29 may increase or decrease depending on the property of the particular engine 13 used. If the resonator portion 29 is smaller in size, the gravitational center G of the upstream side duct module 22 moves forward, and the stability of the upstream side duct module 22 is not reduced. Conversely, if the resonator portion 29 is larger in size, the gravitational center G of the upstream side duct module 22 moves rearward with the result that a certain measure may be required to ensure the stability of the upstream side duct module 22. In such a case, by minimizing the fore and aft dimension D3 of the resonator portion 29, it becomes easier to satisfy the relationship that the fore and aft dimension D2>the fore and aft dimension D3 of the resonator portion 29 while satisfying the relationship that vertical dimension D1 of the vertical front surface 29C>the fore and aft dimension D3 of the resonator portion 29. Thereby, the gravitational center G of the upstream side duct module 22 can be moved forward.

As shown in FIG. 5, because the vertical dimension of the vertical front surface 29C of the resonator portion 29 is significantly great or, in other words, greater than the lateral dimension D6 of the vertical front surface 29C of the resonator portion 29, even when the upstream part (28A, 28E) is placed on the cover member 10 supported by the upper cross member 40 in an inaccurate manner, the upstream side duct module 22 is prevented from becoming unstable.

As shown in FIG. 2, because the resonator portion 29 is formed by the front half 29A positioned on the upstream side of the passage portion 28 and the rear half 29B positioned on the downstream side of the passage portion 28, the resonator portion 29 can be formed with components that are configured to be molded without any difficulty. Thus, a high degree of freedom in design can be achieved. In particular, no tubular member or any other discrete components are required to form the neck portion 36 of the resonator portion 29, and the number of components for the upstream side duct module 22 can be minimized.

Because the connecting portion 22B of the passage portion 28 is integrally formed with the rear half 29B of the resonator portion 29, the number of components for the upstream side duct module 22 can be minimized, and the assembly work for the upstream side duct module 22 can be simplified Because the upstream end part of the passage portion 28 consists of a combination of the lower half 28A made of a relatively hard material and the upper half 28E made of a relatively soft material, the relatively soft upper half 28E favorably absorbs impact at the time of a crash. Because the lower half 28A of the passage portion 28 is integrally formed with the front half 29A of the resonator portion 29, the number of components for the upstream side duct module 22 can be minimized, and the assembly work for the upstream side duct module 22 can be simplified Because the upper half 28E of the passage portion 28 is provided with the flange 37 that extends beyond the outer profile of the lower half 28A, the weight of the upstream part of the passage portion 28 that rests upon the cover member 10 on the upper cross member 40 is increased with the result that the upstream side duct module 22 is kept in a stable condition when the upstream part of the passage portion 28 is placed on the cover member 10 supported by the upper cross member 40.

The rear end of the lower half 28A of the passage portion 28 is formed with the first annular portion 28B which forms the entire circumference of the passage portion 28, and is connected to the second annular portion 28F forming the rear end part of the passage portion 28, and the upper half 28E of the passage portion 28 is laid over the first annular portion 28B. In particular, the rear end part of the first piece 31 forming the upper half 28E is fitted onto the second piece 32 integrally combining the lower half 28A and the first annular portion 28B, and is not connected to the junction between the second piece 32 and the second annular portion 28F. Therefore, the upper half 28E can be fitted onto the first annular portion 28B without causing any significant risk of air leakage.

As shown in FIG. 8, the first annular portion 28B and the second annular portion 28F jointly form a passage section in the rear end part of the passage portion 28, and the passage portion 28 defines the remaining part of the passage that expands laterally toward the front end part thereof without any significant increase in the vertical dimension toward the front end part thereof. Therefore, the cross section of the passage can be ensured over the entire length thereof without increasing the vertical dimension of the passage portion 28.

As shown in FIGS. 7 and 8, the resonator portion 29 is positioned opposite to a part of the shroud and away from the air outlet 11C of the radiator 11 so that the performance of the radiator 11 is not impaired, and the resonator portion 29 is protected from the heat emitted from the radiator 11.

The present invention has been described in terms of a preferred embodiment thereof, but is not limited by the illustrated embodiment, and can be modified and substituted in various ways without departing from the spirit of the present invention. The present invention can also be applied to other forms of vehicles such as railway engines, aircraft and watercraft.

The invention claimed is:

1. An intake duct structure of an engine intake system for an internal combustion engine of a vehicle, the intake duct structure comprising:
    a passage portion internally defining an air passage having an air inlet located in an upstream end part of the passage portion and an air outlet located in a downstream end part of the passage portion, the passage portion extending above a structural member of a vehicle body; and
    a resonator portion depending from the downstream end part of the passage portion and internally defining a resonator chamber;
    wherein the passage portion is provided with a bottom surface configured to rest on an upper surface of the structural member, and the resonator portion is provided with a vertical surface opposing a vertical surface of the structural member and formed by combining an upstream side half positioned on an upstream side with respect to an air flow direction in the passage portion and a downstream side half positioned on a downstream side with respect to the air flow direction in the passage portion,
    wherein the upstream end part of the passage portion is formed by combining a lower half and an upper half, and the lower half is integrally formed with the upstream side half, and
    wherein the lower half is integrally provided at a downstream end thereof with an annular portion, and the upper half is provided with a semi-cylindrical portion that fits upon an upper half of the annular portion.

2. The intake duct structure according to claim 1, wherein the upstream end part of the passage portion is located in a front end part of the passage portion, and the downstream end part of the passage portion is located in a rear end part of the passage portion.

3. The intake duct structure according to claim 2, wherein at least the upstream end part of the passage portion extends substantially horizontally, and the resonator portion internally defines a neck portion communicating the air passage with the resonator chamber.

4. The intake duct structure according to claim 1, wherein the bottom surface of the passage portion extends substantially perpendicularly to the vertical surface of the resonator portion.

5. The intake duct structure according to claim 4, wherein the intake duct structure has a gravitational center located under the bottom surface of the passage portion and ahead of the vertical surface of the resonator portion.

6. The intake duct structure according to claim 5, the lower half of the passage portion is provided with a laterally elongated trough shape having a concave side facing upward and an axial line extending in a fore and aft direction, and is received in a complementary recess formed in a part of the structural member.

7. The intake duct structure according to claim 6, wherein the vertical surface of the resonator portion is substantially planar in shape.

8. The intake duct structure according to claim 2, wherein a horizontal distance between the vertical surface of the resonator portion and an upstream end of the passage portion is greater than a horizontal distance between the vertical surface of the resonator portion and a rear end of the resonator portion.

9. The intake duct structure according to claim 8, wherein the vertical surface of the resonator portion is greater in height than in width.

10. The intake duct structure according to claim 1, wherein the air outlet is defined by a connecting portion having a tubular configuration and configured to be connected to a downstream side intake duct, and the connecting portion is integrally formed with the downstream side half.

11. The intake duct structure according to claim 10, wherein the upper half is softer than the lower half.

12. The intake duct structure according to claim 11, wherein the upper half is provided with a flange extending beyond an outer profile of the lower half.

13. The intake duct structure according to claim 10, wherein the annular portion is configured to be connected to the connecting portion.

14. The intake duct structure according to claim 1, wherein the annular portion defines a part of the air passage having a substantially circular cross section, and a part of the air passage upstream of the annular portion expands laterally toward the upstream end part of the passage portion.

15. The intake duct structure according to claim 14, wherein the structural member includes a cross member of a front bulkhead and a shroud of a radiator supported by the cross member, the passage portion extends in a fore and aft direction above the cross member, and the resonator portion opposes a rear side of the shroud of the radiator.

16. An intake duct structure of an engine intake system for an internal combustion engine of a vehicle, the intake duct structure comprising:
   a passage portion internally defining an air passage having an air inlet located in an upstream end part of the passage portion and an air outlet located in a downstream end part of the passage portion, the passage portion extending above a structural member of a vehicle body; and
   a resonator portion depending from the downstream end part of the passage portion and internally defining a resonator chamber;
   wherein the passage portion is provided with a bottom surface configured to rest on an upper surface of the structural member, and the resonator portion is provided with a vertical surface opposing a vertical surface of the structural member and formed by combining an upstream side half positioned on an upstream side with respect to an air flow direction in the passage portion and a downstream side half positioned on a downstream side with respect to the air flow direction in the passage portion, and
   wherein the upstream side half and the downstream side half of the resonator portion each include an outer peripheral wall extending along an outer periphery thereof and an inwardly receding wall inwardly receding from the outer periphery wall, the inwardly receding walls of the upstream side half and the downstream side half cooperating with the corresponding outer peripheral walls to define a neck portion communicating the air passage with the resonator chamber,
   wherein the upstream end part of the passage portion is formed by combining a lower half and an upper half, and the lower half is integrally formed with the upstream side half, and
   wherein the lower half is integrally provided at a downstream end thereof with an annular portion, and the upper half is provided with a semi-cylindrical portion that fits upon an upper half of the annular portion.

* * * * *